(12) United States Patent
Kitahara et al.

(10) Patent No.: US 10,390,066 B2
(45) Date of Patent: Aug. 20, 2019

(54) INFORMATION PROCESSING APPARATUS, INFORMATION PROCESSING METHOD, PROGRAM, AND SERVER APPARATUS

(71) Applicant: Saturn Licensing LLC, New York, NY (US)

(72) Inventors: Jun Kitahara, Saitama (JP); Naohisa Kitazato, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 14/343,624

(22) PCT Filed: Jun. 21, 2013

(86) PCT No.: PCT/JP2013/003895
§ 371 (c)(1),
(2) Date: Mar. 7, 2014

(87) PCT Pub. No.: WO2014/030284
PCT Pub. Date: Feb. 27, 2014

(65) Prior Publication Data
US 2014/0237531 A1    Aug. 21, 2014

(30) Foreign Application Priority Data

Aug. 21, 2012  (JP) ................................ 2012-182597

(51) Int. Cl.
*H04N 21/435* (2011.01)
*H04N 21/443* (2011.01)
(Continued)

(52) U.S. Cl.
CPC ........... *H04N 21/262* (2013.01); *G06F 21/10* (2013.01); *H04H 60/14* (2013.01); *H04N 21/435* (2013.01);
(Continued)

(58) Field of Classification Search
CPC ............. H04N 21/4345; H04N 21/435; H04N 21/8173; H04N 21/235; H04N 21/443; H04N 21/8166
(Continued)

(56) References Cited

U.S. PATENT DOCUMENTS

| 8,910,224 B1 * | 12/2014 | Calzone ............... H04N 21/458 725/44 |
| 2001/0003846 A1 * | 6/2001 | Rowe ................... G11B 27/031 725/47 |

(Continued)

FOREIGN PATENT DOCUMENTS

| CN | 101212266 A | 7/2008 |
| CN | 100479521 | 4/2009 |

(Continued)

OTHER PUBLICATIONS

International Search Report dated Oct. 1, 2013 in PCT/JP2013/003895.

(Continued)

*Primary Examiner* — Hsiungfei Peng
(74) *Attorney, Agent, or Firm* — Oblon, McClelland, Maier & Neustadt, L.L.P.

(57) ABSTRACT

[Object]
To improve a quality of a service that uses an application that uses a broadcast resource.
[Solving Means]
There is provided an information processing apparatus including: a broadcast processing unit that receives and processes a broadcast resource constituted of a plurality of types of media information; and a controller that acquires an application information table which stores information requisite for activating an application that can use the broadcast resource and first definition information for specifying the type of the media information of the broadcast resource (Continued)

usable by the application, and judges whether the broadcast resource can be used by the application in a unit of the media information.

17 Claims, 21 Drawing Sheets

(51) Int. Cl.
- *H04H 60/14* (2008.01)
- *G06F 21/10* (2013.01)
- *H04N 21/262* (2011.01)

(52) U.S. Cl.
CPC ....... *H04N 21/443* (2013.01); *H04H 2201/40* (2013.01)

(58) Field of Classification Search
USPC ................... 725/32, 105, 109–116, 135, 136
See application file for complete search history.

(56) References Cited

U.S. PATENT DOCUMENTS

| | | | |
|---|---|---|---|
| 2008/0163323 A1* | 7/2008 | Lee | H04H 20/91 725/115 |
| 2011/0093895 A1* | 4/2011 | Lee | H04N 21/4432 725/40 |
| 2011/0235538 A1* | 9/2011 | Manav et al. | 370/252 |
| 2012/0060197 A1 | 3/2012 | Kitahara et al. | |
| 2013/0019265 A1* | 1/2013 | Waller | H04N 21/443 725/40 |
| 2013/0305305 A1* | 11/2013 | Park et al. | 725/109 |
| 2014/0090000 A1* | 3/2014 | Takechi et al. | 725/110 |

FOREIGN PATENT DOCUMENTS

| | | |
|---|---|---|
| CN | 102045597 A | 5/2011 |
| CN | 102308574 | 1/2012 |
| EP | 1 339 222 A2 | 8/2003 |
| EP | 1511297 A | 3/2005 |
| JP | 2005-526451 | 9/2005 |
| JP | 2008-545284 | 12/2008 |
| JP | 2009-094702 | 4/2009 |
| JP | 2009-147808 | 7/2009 |
| JP | 2012257234 A2 | 12/2012 |
| WO | WO 03/098895 A1 | 11/2003 |
| WO | WO 2012/029584 A1 | 3/2012 |
| WO | WO 2012/157698 A1 | 11/2012 |
| WO | WO2012157767 | 11/2012 |

OTHER PUBLICATIONS

Extended Search Report Received for European Patent Application No. 13831395.2, dated Feb. 19, 2016, p. 8.
Russian Office Action dated Apr. 19, 2017 issued in Russian patent application No. 2014114513 with English translation, 10 pages.
Japanese Office Action dated May 9, 2017 issued in Japanese patent application No. 2016-073051 with English translation, 4 pages.
Combined Office Action and Search Report dated Feb. 28, 2017 in Chinese Patent Application No. 201380003476.4 (with English language translation).
Office Action dated May 19, 2015 in Japanese Patent Application No. 2014-510580.
International Search Report dated Oct. 1, 2013 in PCT/JP2013/003895 (with English translation of categories of cited documents).
"Hybridcast", 2011, Pages 7-17 with 1 cover page.
Decision to Grant dispatch date Apr. 3, 2018 in Application No. P2016-073051 with English translation), 3 pages.
Japanese Office Action dated Jan. 8, 2019 in Japanese Application No. 2018-086555 (with English translation), 5 pages.

\* cited by examiner

| field | | | Description |
|---|---|---|---|
| app_name | | | Application name |
| application_identifier | | | ID for uniquely specifying application |
| application_descriptor | | | Versatile descriptor common to application |
| | type | | Designation of application type |
| | control_code | | Designation of value of application_control_code |
| | visibility | | Designation of application visibility |
| | service_bound | | Flag indicating whether application is effective only in current service |
| | priority | | Application priority |
| | version | | Application version |
| | mhp_version | | Version according to platform profile |
| | icon | | Designation of icon |
| | storage_capability | | Storage function performance |
| application_transport | | | Transport protocol descriptor |
| application_location | | | Application location descriptor |
| application_boundary | | | Application boundary descriptor |
| application_specific_descriptor | | | Application specific descriptor |
| application_usage_descriptor | | | Application usage descriptor |
| application_hash_descriptor | | | Application hash value |
| application_id_descriptor | | | Descriptor regarding presentment control of combination of application and program |

FIG.2

22 application hash descriptor

```
<xsd:comlexType name="applicationHashDescriptor">
  <xsd:sequence>
    <xsd:element name="hash_algorithm" type="xsd:string" />
    <xsd:element name="hash_value" type="xsd:hexBinary" />
  <xsd:sequence>
</xsd:complexType>
```

FIG.3

```
</xsd:complexType> name= "ApplicationIdDescriptor" >
<xsd:sequence>
    <xsd:element name= "grant_application_access_flag" type= "xsd:boolean" />
    <xsd:element name= "affiliation" >
        <xsd:complexType>
            <xsd:sequence>
                <xsd:element name= "affilication_name" type= "xsd:string" />
                <xsd:attribute name= "id" type= "xsd:string" />
                <xsd:element ref= "resoucePermission" />
            </xsd:sequence>
        </xsd:complexType>
    </xsd:element>
    <xsd:element name= "terrestrial_broadcaster" >
        <xsd:complexType>
            <xsd:sequence>
                <xsd:element name= "terrestrial_broadcaster_name" type= "xsd:string" />
                <xsd:attribute name= "id" type= "xsd:string" />
                <xsd:element ref= "resoucePermission" />
            </xsd:sequence>
        </xsd:complexType>
    </xsd:element>
    <xsd:element name= "broadcaster" >
        <xsd:complexType>
            <xsd:sequence>
                <xsd:element name= "broadcaster_name" type= "xsd:string" />
                <xsd:attribute name= "id" type= "xsd:string" />
                <xsd:element ref= "resoucePermission" />
            </xsd:sequence>
        </xsd:complexType>
    </xsd:element>
```

FIG.4

```
<xsd:element name="event" >
  <xsd:complexType>
    <xsd:sequence>
      <xsd:attributeGroup ref="event" />
    </xsd:sequence>
  </xsd:complexType>
</xsd:element>
</xsd:sequence>
</xsd:complexType>

<xsd:attributeGroup name="event" >
  <xsd:sequence>
    <xsd:element name="event_name"    type="xsd:string" />
    <xsd:attribute name="network_id"    type="xsd:string" />
    <xsd:attribute name="transport_stream_id"  type="xsd:string" />
    <xsd:attribute name="service_id"    type="xsd:string" />
    <xsd:attribute name="event_id"    type="xsd:string" / minOccurs=0>
    <xsd:element ref="resoucePermission" />
  </xsd:sequence>
</xsd:complexType>

<xsd:complexType name="resoucePermission" >
  <xsd:sequence>
    <xsd:element name="access_permission"   type="xsd:unsignedByte" />
    <xsd:element name="rendering_permission" type="xsd:unsignedByte" />
  </xsd:sequence>
  <xsd:attribute name="id" type="xsd:positiveInteger" />
</xsd:complexType>
```

FIG.5

```
<xsd:comlexType name="resoucePermission" >
    <xsd:sequence>
        <xsd:element name="video_scaling"        type="xsd:boolean" minOccurs=0 maxOccurs=1/>
        <xsd:element name="video_overlay"        type="xsd:boolean" minOccurs=0 maxOccurs=1/>
        <xsd:element name="realtime_tuning"      type=xsd:boolean   minOccurs=0 maxOccurs=1/>
        <xsd:element name="reservation_tunning"  type="xsd:boolean" minOccurs=0 maxOccurs=1/>
        <xsd:element name="SI_reference"         type="xsd:boolean" minOccurs=0 maxOccurs=1/>
        <xsd:element name="currnet_tuninginfo"   type="xsd:boolean" minOccurs=0 maxOccurs=1/>
        <xsd:element name="NVRam_access"         type="xsd:boolean" minOccurs=0 maxOccurs=1/>
    </xsd:sequence>
    <xsd:attribute name="permission_id" type="xsd:string" />
</xsd:complexType>
```

FIG.6

```
<xsd:comlexType name="resoucePermission">
  <xsd:sequence>
    <xsd:element name="access_permission" type="xsd:string" minOcuur=0 maxOccur=unbound/>
    <xsd:element name="rendering_permission" type="xsd:string" minOcuur=0 maxOccur=unbound/>
  </xsd:sequence>
  <xsd:attribute name="permission_id" type="xsd:string" />
</xsd:complexType>
```

FIG.7

```
<xsd:complexType name="ApplicationIdDescriptor" >
<xsd:sequence>
  <xsd:element name="grant_application_access_flag" type="xsd:boolean" />
  <xsd:element name="affiliation" >
    <xsd:complexType>
      <xsd:sequence>
        <xsd:attribute name="id " type="xsd:string" />
        <xsd:attribute name="resoucePermission" type="xsd:unsignedByte" />
      </xsd:sequence>
    </xsd:complexType>
  </xsd:element>
  <xsd:element name="terrestrial_broadcaster" >
    <xsd:complexType>
      <xsd:sequence>
        <xsd:attribute name="id " type="xsd:string" />
        <xsd:attribute name="resoucePermission" type="xsd:unsignedByte" />
      </xsd:sequence>
    </xsd:complexType>
  </xsd:element>
  <xsd:element name="broadcaster" >
    <xsd:complexType>
      <xsd:sequence>
        <xsd:attribute name="id " type="xsd:string" />
        <xsd:attribute name="resoucePermission" type="xsd:unsignedByte" />
      </xsd:sequence>
    </xsd:complexType>
  </xsd:element>
```

FIG.8

```
<xsd:element name="event" >
  <xsd:complexType>
    <xsd:sequence>
      <xsd:attributeGroup ref="event" />
    </xsd:sequence>
  </xsd:complexType>
  </xsd:element>
  </xsd:sequence>
</xsd:complexType>

<xsd:attributeGroup name="event" >
  <xsd:sequence>
    <xsd:attribute name="network_id" type="xsd:string" />
    <xsd:attribute name="transport_stream_id" type="xsd:string" />
    <xsd:attribute name="service_id" type="xsd:string" />
    <xsd:attribute name="event_id" type="xsd:string" />
    <xsd:attribute name="resoucePermission" type="xsd:unsignedByte" />
  </xsd:sequence>
</xsd:complexType>
```

FIG.9

```
<?xml version="1.0" encoding="UTF-8"?>
<ApplicationIdDescriptor>
<grant_application_access_flag> 1 </grant_application_access_flag>
<affiliation id=00000001>
    <name> affiliation_A </name>
    <resourcePermission id=01>
        <access_permission> 10 </access_permission>
        <rendering_permission> 20 </rendering_permission>
    </resourcePermission>
</affiliation>
<broadcaster id=00000002>
    <name> broadcaster_B </name>
    <resourcePermission id=02>
        <access_permission> 30 </access_permission>
        <rendering_permission> 40 </rendering_permission>
    </resourcePermission>
</broadcaster>
</ApplicationIdDescriptor>
```

FIG.10

| Code | Identification name | Meaning |
|---|---|---|
| 0x00 | | reserved_future_use |
| 0x01 | AUTOSTART | When service is selected, application is activated automatically (excluding case where application is already being executed). |
| 0x02 | PRESENT | Indicates that application is in executable state while service is being selected. No automatic activation. |
| 0x03 | DESTROY | Application ends processing. |
| 0x04 | KILL | Application immediately ends processing. |
| 0x05 | PREFETCH | Application file group is cached if receiver permits. Application is not started. |
| 0x06 | REMOTE | Indicates that application can be acquired from another transport stream instead of current stream. |
| 0x07 | DISABLED | Indicates that application cannot be activated. |
| 0x08 | PLAYBACK_AUTOSTART | When receiver executes reproduction from storage apparatus, application is activated as in "AUTOSTART" |
| 0x09 to 0xFF | | reserved_future_use |

FIG.11

Application non-display

INFORMATION PROCESSING APPARATUS, INFORMATION PROCESSING METHOD, PROGRAM, AND SERVER APPARATUS

TECHNICAL FIELD

The present disclosure relates to an information processing apparatus, an information processing method, a program, and a server apparatus with which an application can be executed using an application management table.

BACKGROUND ART

In recent years, a technique that enables an application delivered via a network such as the Internet to be executed simultaneous with a reproduction of a broadcast content has been known. As such a technique, a technique called hybrid broadcast broadband TV (hereinafter, referred to as "HbbTV") is known. As a standard of HbbTV, "ETSI TS 102 796" (see Non-patent Literature 1) has been developed in Europe. Further, the standard "ARIB STD-B23" (see Non-patent Literature 2) conforming thereto has been developed also in our country.

For example, in a system in which an application is executed simultaneous with a reproduction of a broadcast content as in HbbTV, a life cycle of an application from an activation to an end is managed by a data structure called AIT (Application Information Table) section superimposed on a broadcast content. An information terminal that has acquired the AIT section controls the application based on an application control code included in the AIT section.

Moreover, there is an XML-AIT described in an XML format as a format optimal for providing information related to an application to a receiver using a communication network such as the Internet, the XML-AIT including information equivalent to a broadcast AIT section.

CITATION LIST

Non Patent Literature

Non Patent Literature 1

ETSI (European Telecommunications Standards Institute) "ETSI TS 102 796 V1.1.1 (2010-06)" http://www.etsi-.org/deliver/etsi_ts/102700_102799/102796/ 01.01.01_60/ts_102796 v010101p.pdf (browsed on Oct. 21, 2011)

Non Patent Literature 2

Association of Radio Industries and Businesses "Application execution environment standard ARIB STD-B23 1.2 in digital broadcast" http://www.arib.or.jp/english/html/ overview/doc/2-STD-B23v1_2.pdf (browsed on Oct. 21, 2011)

SUMMARY

Technical Problems

In the future, a service that provides an application not directly related to broadcast (broadcast-unlinked application) in addition to an application executed in link with a broadcast program of digital terrestrial broadcast or the like (broadcast-linked application) is expected to be started. However, in actually operating a service that uses a broadcast-unlinked application, there are still various problems to be solved, and countermeasures are desired.

An object of the present disclosure is to provide an information processing apparatus, an information processing method, a program, and a server apparatus with which a quality of a service that uses an application that uses a broadcast resource can be improved.

Solution to Problems

To solve the problems described above, according to the present disclosure, there is provided an information processing apparatus including: a broadcast processing unit that receives and processes a broadcast resource constituted of a plurality of types of media information; and a controller that acquires an application information table which stores information requisite for activating an application that can use the broadcast resource and first definition information for specifying the type of the media information of the broadcast resource usable by the application, and judges whether the broadcast resource can be used by the application in a unit of the media information.

In the information processing apparatus, the application information table may store second definition information for limiting an operation of the application that uses the broadcast resource in association with the first definition information, and the controller may control, when it is judged that the broadcast resource can be used by the application in the unit of the media information, the operation of the application that uses the broadcast resource based on the second definition information.

In the information processing apparatus, the application information table may store third definition information for defining a broadcast unit accessible by the application in association with the first definition information and the second definition information, and the controller may perform, in the broadcast unit defined by the third definition information, the judgment on whether the broadcast resource can be used by the application in the unit of the media information and the control of the operation of the application that uses the broadcast resource.

In the information processing apparatus, the application information table may store information requisite for validating the application information table, and the controller may validate the application information table using the information requisite for the validation and when succeeding in the validation, move on to the judgment on whether the broadcast resource can be used by the application in the unit of the media information.

In the information processing apparatus, the controller may judge, when a broadcast channel switch instruction from a user occurs while the application is being executed, whether a broadcast resource of a switch-destination broadcast channel can be used by the application based on the access permission information, cause the application to be continuously executed and access the broadcast resource of the switch-destination broadcast channel when judged that the broadcast resource is usable, and cause the application to end and access the broadcast resource of the switch-destination broadcast channel when judged that the broadcast resource is unusable.

According to the present disclosure, there is provided an information processing method including: receiving, by a broadcast processing unit, a broadcast resource constituted of a plurality of types of media information; and acquiring, by a controller, an application information table which stores information requisite for activating an application that can use the broadcast resource and first definition information for specifying the type of the media information of the broadcast resource usable by the application, and judging whether the broadcast resource can be used by the application in a unit of the media information.

According to another aspect of the present disclosure, there is provided a program that causes a computer to function as: a broadcast processing unit that receives and processes a broadcast resource constituted of a plurality of types of media information; and a controller that acquires an application information table which stores information requisite for activating an application that can use the broadcast resource and first definition information for specifying the type of the media information of the broadcast resource usable by the application, and judges whether the broadcast resource can be used by the application in a unit of the media information.

According to another aspect of the present disclosure, there is provided a server apparatus including a generation unit that generates an application information table which stores information requisite for activating an application that can use a broadcast resource in an information processing apparatus and first definition information for specifying a type of the media information of the broadcast resource usable by the application, and responds to an acquisition request for the application information table from the information processing apparatus.

In the server apparatus, the generation unit may store, in the application information table, second definition information for limiting an operation of the application that uses the broadcast resource in association with the first definition information.

In the server apparatus, the generation unit may store, in the application information table, third definition information for defining a broadcast unit accessible by the application in association with the first definition information and the second definition information.

In the server apparatus, the generation unit may store, in the application information table, information requisite for validating the application information table.

As described above, according to the present disclosure, a quality of the service that uses the application that uses the broadcast resource can be improved.

BRIEF DESCRIPTION OF DRAWINGS

FIG. 2 A diagram showing a data structure of an XML-AIT of this embodiment.
FIG. 3 A diagram showing a data structure of an application hash descriptor described in the XML-AIT.
FIG. 4 A diagram showing an example of an XML schema defining a logical structure of an application identification descriptor.
FIG. 5 A diagram showing an example of the XML schema defining the logical structure of the application identification descriptor.
FIG. 6 A diagram showing an example of an XML schema of resource permission information.
FIG. 7 A diagram showing another example of the XML schema of the resource permission information.
FIG. 8 A diagram showing another example of the XML schema of the resource permission information.
FIG. 9 A diagram showing another example of the XML schema of the resource permission information.
FIG. 10 A diagram showing a specific example of the application identification descriptor.
FIG. 11 A diagram showing definitions of application control codes stored in the XML-AIT.

DESCRIPTION OF EMBODIMENT

Hereinafter, an embodiment of the present disclosure will be described with reference to the drawings.

First Embodiment

Figure 1:
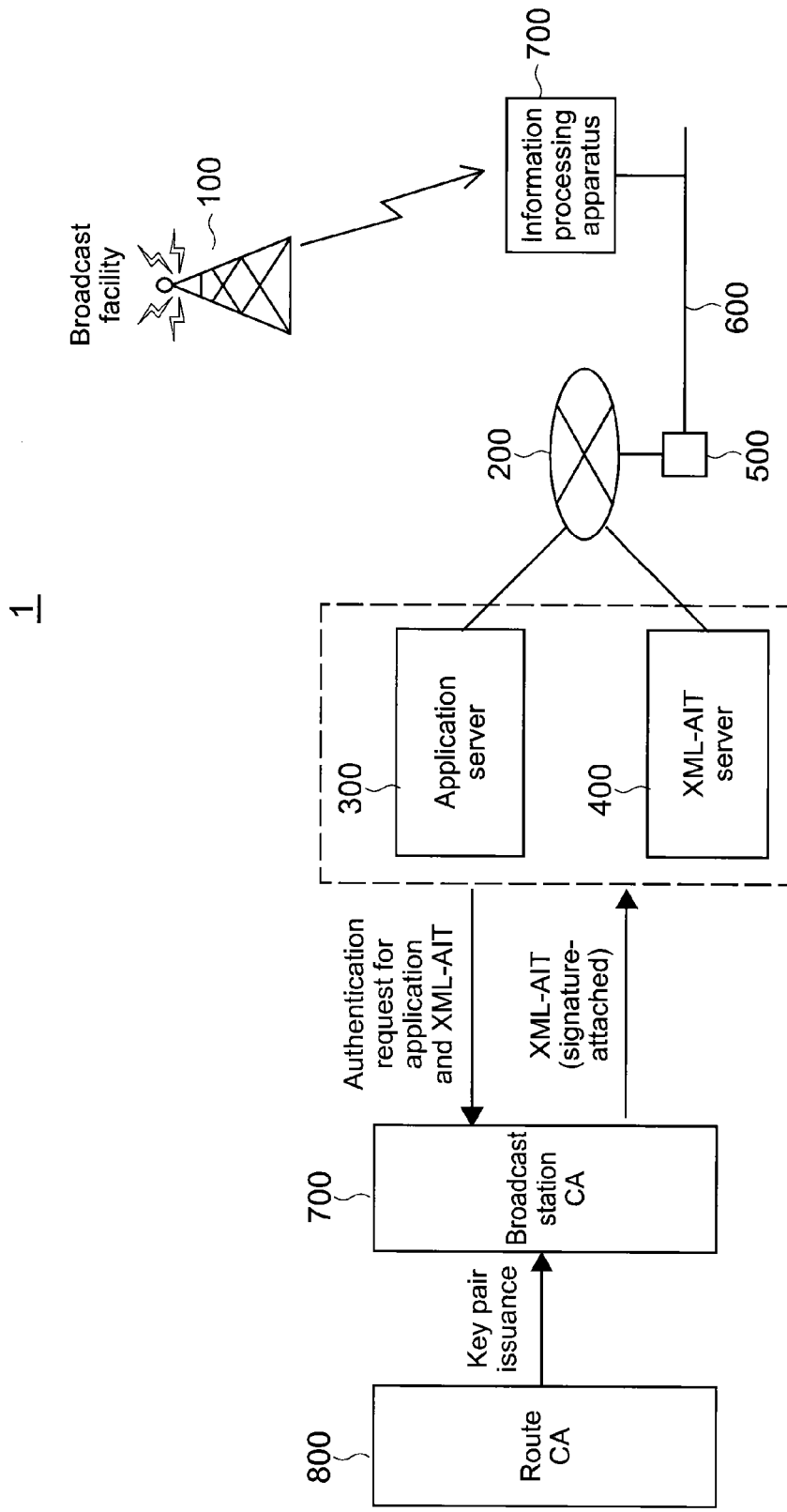
FIG. 1 A diagram showing a general outline of an information processing system of this embodiment.

[Information Processing System]
FIG. 1 is a diagram showing a general outline of an information processing system of this embodiment.

The information processing system 1 of this embodiment includes a broadcast facility 100, a first network 200 such as the Internet, an application server 300, an XML-AIT server 400, an edge router 500, a second network 600 such as a LAN (Local Area Network), and an information processing apparatus 700 as a broadcast receiver.

The broadcast facility 100 transmits digital broadcast signals via a communication medium such as terrestrial, satellite, and IP (Internet Protocol) networks. The broadcast facility 100 transmits a so-called broadcast stream obtained by superimposing an AV stream in which transport streams of a video, audio, subtitle, and the like are multiplexed, data accompanying the AV stream, and the like. The data accompanying the AV stream includes a broadcast-linked application described in a markup language such as HTML and BML and a script language such as Java (registered trademark) script, and an XML-AIT (Extensible Markup Language-Application Information Table) constituted of information for managing the application.

It should be noted that in this embodiment, the AV stream transmitted after multiplexing the transport streams of a video, audio, subtitle, and the like is referred to as "broadcast content", and this term does not include meanings of the application and the XML-AIT.

The application server 300 is connectable to the first network 200 and provides a broadcast-unlinked application not directly related to the broadcast to the information processing apparatus 700 via the first network 200. The broadcast-unlinked application is an application created by those other than the creator of a broadcast resource, and while processing of acquiring various types of broadcast resources of a video, audio, subtitle, SI information, data broadcast, and the like from the broadcast and presenting them can be carried out, it is desirable to require a certain authentication on whether the broadcast resource can actually be accessed.

The XML-AIT server 400 is connectable to the first network 200 and delivers an XML-AIT for managing a broadcast-unlinked application provided from the application server 300 to the information processing apparatus 700 via the first network 200.

It should be noted that the application server 300 and the XML-AIT server 400 may be constituted as a single server. The application server 300 and the XML-AIT server 400 each include a CPU, a main memory, a data storage, and a user interface and have a typical computer structure. The main memory or data storage stores programs for causing the computer to function as a table transmission unit.

The edge router 500 is a router for connecting the first network 200 and the second network 600. The second network 600 may either be in a wired or wireless manner.

The information processing apparatus 700 is, for example, a personal computer, a cellular phone, a smartphone, a television apparatus, a game device, a tablet terminal, and an audio/video reproduction apparatus, though a product form thereof is not specifically limited.

The information processing apparatus 700 receives digital broadcast signals from the broadcast facility 100 and demodulates the signals to acquire a transport stream. The information processing apparatus 700 separates a broadcast stream from the transport stream, decodes it, and outputs it to a display unit (not shown) and speaker unit (not shown) connected to the information processing apparatus 700 or a recording apparatus (not shown).

It should be noted that the display unit, the speaker unit, and the recording apparatus may be integrated with the information processing apparatus 700, or they may be directly connected to the information processing apparatus 700 or indirectly connected via the second network 600 as independent apparatuses. Alternatively, an apparatus (not shown) including the display unit and the speaker unit may be directly connected or indirectly connected to the information processing apparatus 700 via the second network 600.

The information processing apparatus 700 is capable of acquiring an XML-AIT file from the XML-AIT server 400, interpreting it, acquiring a broadcast-unlinked application from the application server 300, and performing activation control and the like.

[Broadcast-Unlinked Application]

Here, a complementary explanation will be given on the broadcast-unlinked application. The broadcast-unlinked application is provided to the information processing apparatus 700 from the application server 300. The broadcast-unlinked application is constituted of, for example, an HTML (Hyper Text Markup Language) document, a BML (Broadcast Markup Language) document, an MHEG (Multimedia and Hypermedia information coding) document, a Java (registered trademark) script, a still image file, and a moving image file.

The broadcast-unlinked application may either be visible or invisible. A visible application is an application with which a user can observe its state via a screen. An invisible application is an application with which the user cannot observe its state via the screen and is, for example, an application used when a browser is being activated in a transparent state invisible from the user or an application for recording information for specifying a broadcast content viewed in the information processing apparatus or a viewing time and delivering it to a specific server for the purpose of a rating survey or the like.

Moreover, the broadcast-unlinked application may be a bidirectional application capable of changing information or a function presented according to an operation of the user of the information processing apparatus 700, or may be an application that unidirectionally presents information to the user.

[Data Structure of XML-AIT]

Next, a data structure of the XML-AIT will be described.

FIG. 2 is a diagram showing the data structure of the XML-AIT of this embodiment. The XML-AIT stores, for each application, an application name, an application identifier, an application descriptor, an application type, an application control code 21, an application visibility, a flag indicating whether an application is effective in only the current service, an application priority, an application version, a version according to platform profile, an icon, storage function performance, a transport protocol descriptor, an application location descriptor, an application boundary descriptor, an application specific descriptor, an application usage descriptor, an application mode descriptor, an application hash descriptor 22, an application identification descriptor 23, and the like.

Attached to the XML-AIT is an electronic signature for detecting a falsification. An XML signature is used as the electronic signature, for example. The format of the XML signature may be any of a detached signature independent from the XML-AIT, an enveloping signature having a format including the XML-AIT, and an enveloped signature in a format included in the XML-AIT. It should be noted that the detached signature only needs to be adopted for suppressing an influence on the format of the XML-AIT.

An application controller 708 of the information processing apparatus 700 validates the XML signature according to a procedure for a core validation (Core-Validation) including a reference validation (Reference-Validation) and a signature validation (Signature-Validation).

The reference validation is a method of validating a reference (Reference) digest value (DigestValue) by applying a normalization transformation process (Transform) and a digest calculation algorithm (DigestMethod) to a resource (XML-AIT). A result obtained by the reference validation and the registered digest value (DigestValue) are compared, and when the values do not match, the validation becomes a failure.

The signature validation is a method of serializing signature information (SignatureInfo) elements by a normalization method designated by an XML normalization algorithm (CanonicalizationMethod), acquiring key data using key information (KeyInfo) and the like, and validating a signature using a method designated by a signature algorithm (SignatureMethod).

FIG. 3 is a diagram showing an example of an XML schema defining a data structure of the application hash descriptor 22.

In the XML schema, an applicationHashDescriptor element is declared as a complexType element. The applicationHashDescriptor element includes, subservient to a sequence element as a sub-element thereof, an element that declares a name and form of a hash_algorithm element storing a hash algorithm indicating a hashvalue calculation method and an element that declares a name and form of a hash_value element storing an application hash value. The application hash value is a value generated from a substance of the application using a predetermined hash function and the like and can be said to be a value representing the application.

Details of Application Identification Descriptor 23

Next, details of the application identification descriptor 23 will be described.

As the application identification descriptor 23, the following is included.

1. Information defining a broadcast unit accessible by a broadcast-unlinked application, such as a broadcast station affiliation, a broadcast station, a channel, and an event (program) (third definition information)

2. Information defining a type of media information (video, audio, SI information, subtitle, data broadcast, etc.) constituting a broadcast resource that can be used by a broadcast-unlinked application (hereinafter, referred to as "access permission information") (first definition information)

3. Information that limits an operation of a broadcast-unlinked application using a broadcast resource (hereinafter, referred to as "rendering permission information") (second definition information)

The access permission information and the rendering permission information are collectively referred to as "resource permission information".

FIGS. 4 and 5 are diagrams each showing an example of the XML schema defining a logical structure of the application identification descriptor 23 (ApplicationIdDescriptor).

In the XML schema, an ApplicationIdDescriptor element is declared as the complexType element.

Subservient to the sequence element as a sub-element of the ApplicationIdDescriptor element, a grant_application_access_flag element, an affiliation element, a terrestrial_broadcaster element, a broadcaster element, and an event element are declared.

The ApplicationIdDescriptor element is an element that stores an acceptance application access flag. The acceptance application access flag takes a value of either "0" or "1". When the acceptance application access flag is "0", a content described in the application identification descriptor 23 is interpreted as a condition for prohibiting a simultaneous presentment with an application (blacklist). When the acceptance application access flag is "1", the content described in the application identification descriptor 23 is interpreted as a condition for permitting the simultaneous presentment with an application (whitelist).

The affiliation element includes, subservient thereto, an element that declares a name and form of an affiliation_name element storing a name of the broadcast affiliation station, an element that declares a name and form of an attribute storing an identifier (id) of the broadcast affiliation station, and an element that indicates, as a reference destination, another element defining a structure of resource permission information (resouce_permission) of the broadcast affiliation station.

The terrestrial_broadcaster element includes, subservient thereto, an element that declares a name and form of a terrestrial_broadcaster_name element storing a name of a digital terrestrial broadcast station, an element that declares a name and form of an attribute storing an identifier (id) of the digital terrestrial broadcast station, and an element that indicates, as a reference destination, another element defining a structure of the resource permission information (resouce_permission) of the digital terrestrial broadcast station.

The broadcaster element includes, subservient thereto, an element that declares a name and form of a broadcaster_name element storing a name of the BS/CS broadcast station, an element that declares a name and form of an attribute storing an identifier (id) of the BS/CS broadcast station, and an element that indicates, as a reference destination, another element defining a structure of the resource permission information (resouce_permission) of the BS/CS broadcast station.

The event element includes, subservient thereto, an element that indicates, as a reference destination, another element defining a structure of information for designating an event (attributeGroup_name element).

The attributeGroup_name element includes, subservient thereto, an element that declares a name and form of an event_name element storing a name of an event, an element that declares a name and form of a network_id attribute storing a network ID, an element that declares a name and form of a transport_stream_id attribute storing a transport stream ID, an element that declares a name and form of a service_id attribute storing a service ID, an element that declares a name and form of an event_id attribute storing an event ID, and an element that indicates, as a reference destination, another element defining a structure of the resource permission information (resouce_permission) of the event.

Here, the network_id attribute, the transport_stream_id attribute, and the service_id attribute are information for identifying a channel.

Further, the value of the attribute defining the name and form of the event_id attribute does not need to be described. When there is no description, only the channel has been designated.

In the XML schema, as another complexType element, a resouce_permission element is declared. The resouce_permission element includes, subservient thereto, an element that defines a name and form of an access_permission element storing the access permission information, an element that defines a name and form of a rendering_permission element storing the rendering permission information, and an element that declares a name and form of an attribute storing an identifier (id) of the resource permission information (resouce_permission).

It should be noted that although values from "0" to "128" are stored as the access_permission element and the rendering_permission element in the schemas of FIGS. 4 and 5, it is also possible to define a plurality of elements storing the value of "0" or "1", that indicates whether to designate for each resource permission information (resouce_permission) whose meaning is defined in advance, in the resouce_permission element as shown in FIG. 6.

In the XML schema of the resource permission information (resouce_permission) shown in FIG. 6, the video_scaling element is an element is an element for storing a value that designates whether to execute an application while scaling a video, the video_overlay element is an element for storing a value that designates whether to execute an application while overlaying a video, the realtime_tuning element is an element for storing a value that designates whether to tune in on a current broadcast program from an application, the reservation_tuning element is an element for storing a value that designates whether to tune in for a timer recording from an application, the SI_reference element is an element for storing a value that designates whether to reference SI information from an application, the current_tuninginfo element is an element for storing a value that designates whether to reference program information currently being selected from an application, and the NVRam_access element is an element for storing a value that designates whether to access an NVRAM (Non Volatile RAM) in an information processing apparatus from an application.

Also in the XML schema of the resource permission information (resouce_permission), an element that declares a name and form of an attribute storing an identifier of the resource permission information (Permission_id) is declared.

FIG. 7 is a diagram showing another example of the XML schema of the resource permission information.

In the XML schema, forms of the access_permission element and the rendering_permission element in the resouce_permission element are defined as "xsd:string" and "min0cuur=0max0ccur=unbound". Accordingly, for the access_permission element and the rendering_permission element, contents of the elements can be defined by character strings without an upper limit.

It should be noted that min0cuur=0 means that the lower limit of the number of definable elements is "0", that is, the definitions of the elements can be omitted. Max0ccur=unbound means that there is no upper limit in the number of definable elements. Details of the meanings of the elements are determined arbitrarily in the service.

FIGS. 8 and 9 are diagrams each showing another example of the XML schema of the resource permission information.

Although the structure of the resource permission information (resouce_permission) is defined in the resouce_permission element as the complexType element outside the ApplicationIdDescriptor element in the schemas shown in FIGS. 4 and 5, the resouce_permission element is defined in the attributeGroup_name element as a reference destination of each of the affiliation element, the terrestrial_broadcaster element, the broadcaster element, and the event element in the schemas shown in FIGS. 8 and 9.

FIG. 10 is a diagram showing a specific example of the application identification descriptor 23 created using the XML schemas shown in FIGS. 4 and 5 or FIGS. 8 and 9.

The specific example of the application identification descriptor 23 shows a case where the resource permission information is designated as a whitelist with respect to the broadcast unit of the broadcast affiliation station and the BS/CS broadcast station.

Specifically, with respect to a broadcast affiliation station whose acceptance application access flag is "1", identifier is "00000001", and name is "affiliation_A", the resource permission information (resouce_permission) whose identifier is "01", value of the access permission information (access_permission) is "10", and value of the rendering permission information (rendering_permission) is "20" is designated. Moreover, with respect to a BS/CS broadcast station whose identifier is "00000002" and name is "broadcaster B", the resource permission information (resouce_permission) whose identifier is "02", value of the access permission information (access_permission) is "30", and value of the rendering permission information (rendering_permission) is "40" is designated.

The meanings allocated to the value of the access permission information (access_permission) and the value of the rendering permission information (rendering_permission) are determined arbitrarily in a service.

Definitions of Application Control Codes

A life cycle of an application is dynamically controlled by the information processing apparatus 700 based on the application control code 21 stored in the XML-AIT.

FIG. 11 is a diagram showing definitions of the application control codes 21 stored in the XML-AIT.

As shown in the figure, as the application control codes, there are "AUTOSTART", "PRESENT", "DESTROY", "KILL", "PREFETCH", "REMOTE", "DISABLED", and "PLAYBACK AUTOSTART" as the standard. The definitions of the application control codes are as follows.

"AUTOSTART" is a code that instructs to automatically activate an application along with a service selection, provided that the application is not yet executed.

"PRESENT" is a code that instructs to set an application to an executable state while the service is being selected. It should be noted that a target application is not automatically activated along with the service selection and is activated upon reception of an activation instruction from the user.

"DESTROY" is a code that instructs to permit an end of an application.

"KILL" is a code that instructs to forcibly end an application.

"PREFETCH" is a code that instructs to cache an application.

"REMOTE" is a code indicating that an application is an application that cannot be acquired in a current transport stream. Such an application becomes usable when acquired from another transport stream or a cache.

"DISABLED" is a code indicating that an application activation is prohibited.

"PLAYBACK_AUTOSTART" is a code for activating an application along with a reproduction of a broadcast content recoded onto a storage (recording apparatus).

Structure of Information Processing Apparatus

Figure 12:
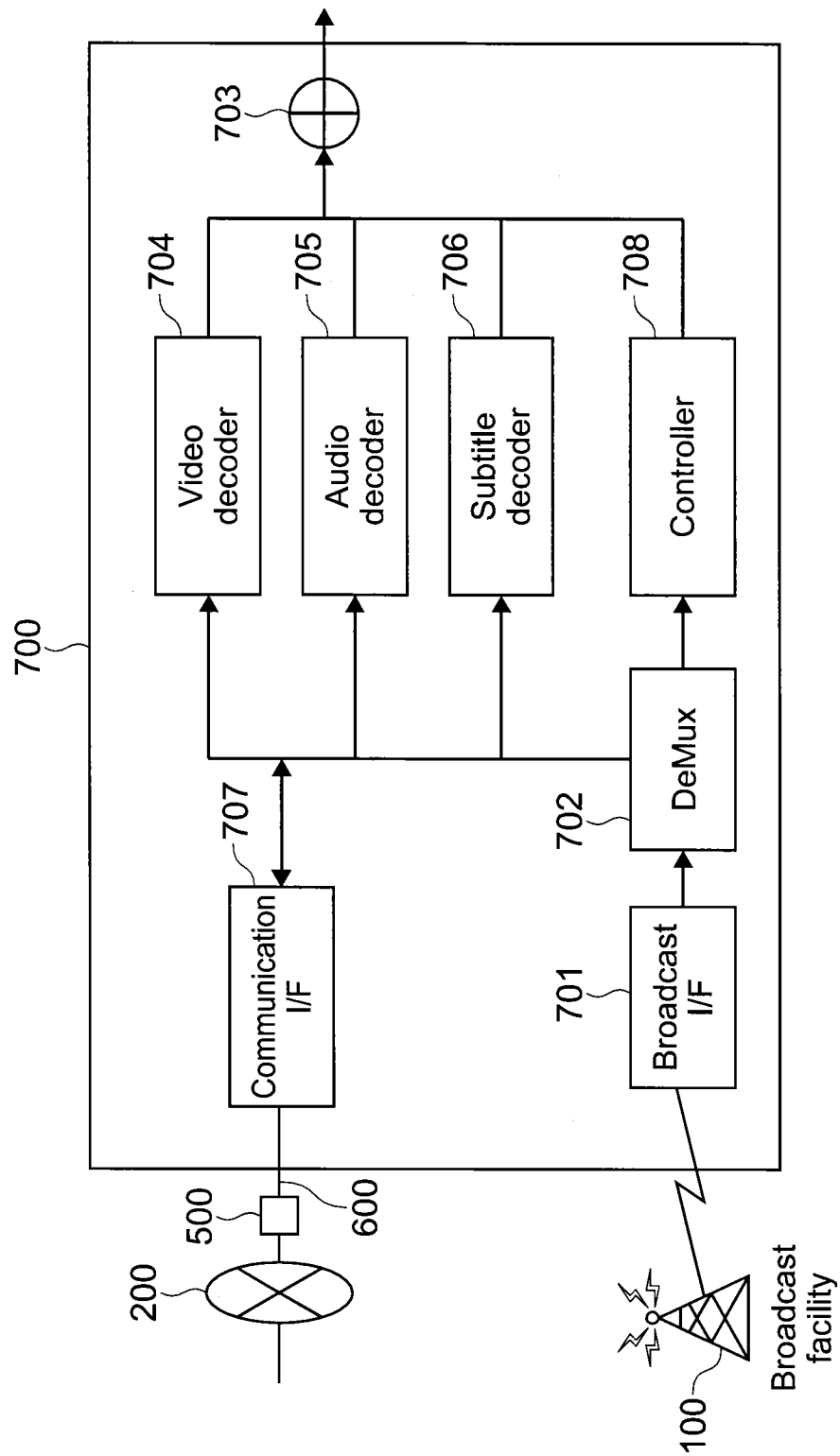
FIG. 12 A block diagram showing a structure of an information processing apparatus of this embodiment.

FIG. 12 is a block diagram showing a structure of the information processing apparatus 700 of this embodiment.

The information processing apparatus 700 includes a broadcast interface 701, a demultiplexer 702, an output processing unit 703, a video decoder 704, an audio decoder 705, a subtitle decoder 706, a communication interface 707, and an application controller 708 (controller).

The broadcast interface 701 includes an antenna and a tuner and uses them to receive digital broadcast signals selected by the user. The broadcast interface 701 outputs a transport stream acquired by carrying out demodulation processing on the received digital broadcast signals to the demultiplexer 702.

The demultiplexer 702 separates a stream packet of a broadcast content, an application packet, and an AIT section packet from the transport stream. The demultiplexer 702 separates a video ES (Elementary Stream), an audio ES, and a subtitle ES from the stream packet of the broadcast content. The demultiplexer 702 distributes the video ES to the video decoder 704, the audio ES to the audio decoder 705, the subtitle ES to the subtitle decoder 706, and the application packet and a PSI/SI (Program Specific Information/Service Information) packet including the AIT section to the application controller 708.

The video decoder 704 decodes the video ES to generate a video signal and outputs the generated video signal to the output processing unit 703. The audio decoder 705 decodes the audio ES to generate an audio signal and outputs the generated audio signal to the output processing unit 703.

The subtitle decoder 706 decodes the subtitle ES to generate a subtitle signal and outputs the generated subtitle signal to the output processing unit 703.

The broadcast interface 701, the demultiplexer 702, the output processing unit 703, the video decoder 704, the audio decoder 705, and the subtitle decoder 706 constitute a broadcast processing unit that receives and processes a broadcast content.

The communication interface 707 is an interface for establishing communication with an external apparatus via the second network 600 such as a LAN. The communication interface 707 may take either wireless communication or wired communication.

The application controller 708 is a controller that carries out processing related to control of applications.

The output processing unit 703 synthesizes the video signal from the video decoder 704, the audio signal from the audio decoder 705, the subtitle signal from the subtitle decoder 706, the video signal and audio signal from the application controller 708, and the like and outputs the resultant to the recording apparatus (not shown), display unit, and speaker unit (not shown) connected to the information processing apparatus 700.

A part or all of the structure including at least the application controller 708 of the information processing apparatus 700 can be provided by a computer including a CPU (Central Processing Unit) and a memory and a program that causes the computer to function as the broadcast processing unit, the application controller 708, and the like.

Operation of Information Processing System 1

Next, an operation of the information processing system 1 of this embodiment will be described.

The descriptions of the operation will be given in the following order.

1. Control of use of broadcast resource by broadcast-unlinked application

2. Generation and validation of signature and hash value (1. Control of use of broadcast resource by broadcast-unlinked application)

Figure 13:
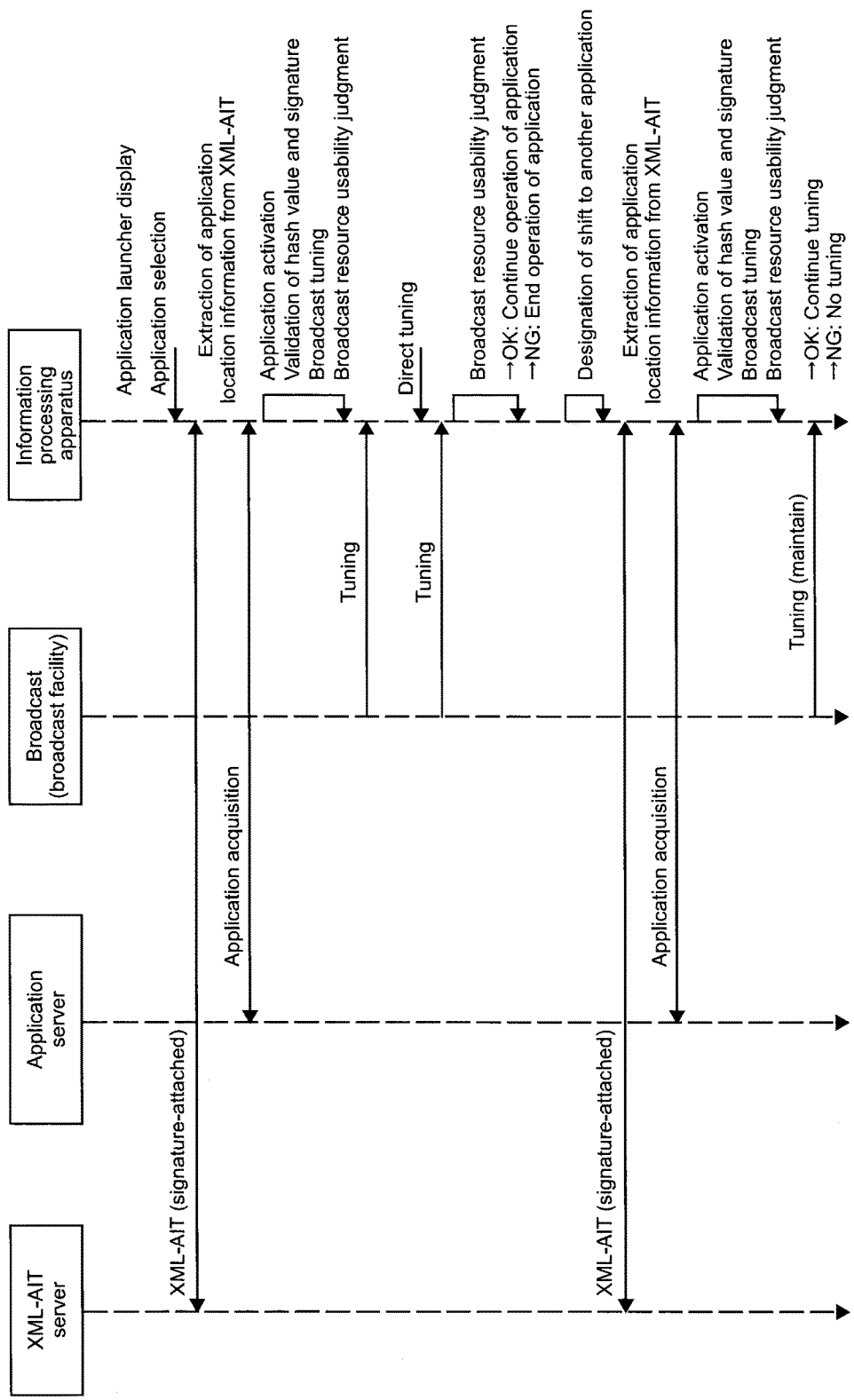
FIG. 13 A sequence diagram showing a flow of exchanges among a broadcast facility, an application server, an XML-AIT server, and the information processing apparatus.
Figure 14:
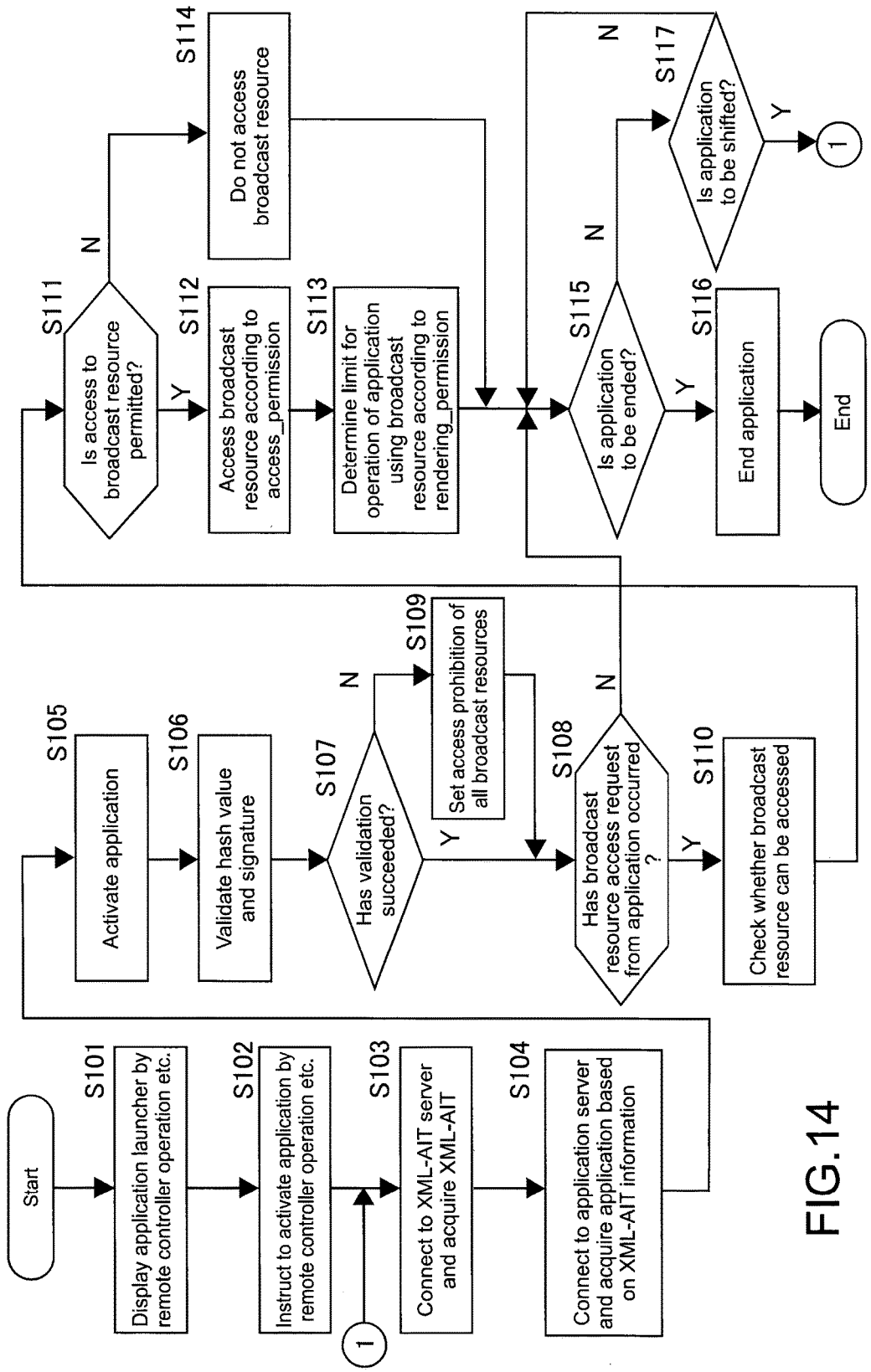
FIG. 14 A flowchart showing a processing procedure of the information processing apparatus shown in FIG. 13.

FIG. 13 is a sequence diagram showing a flow of exchanges among the broadcast facility 100, the application server 300, the XML-AIT server 400, and the information processing apparatus 700. FIG. 14 is a flowchart showing a processing procedure of the information processing apparatus 700.

The information processing apparatus 700 displays an application launcher selected by the user using a remote controller, for example (Step S101). The application launcher is realized by, for example, a so-called resident application mounted on the information processing apparatus 700, HTML 5 (Hyper Text Markup Language 5) presented by an HTML browser, or BML (Broadcast Markup Language). The application launcher displays a menu of a broadcast-unlinked application.

The user can select a broadcast-unlinked application to be presented using a remote controller, for example. In the menu of the broadcast-unlinked application displayed in the application launcher, a script for causing the information processing apparatus 700 to acquire an XML-AIT for a broadcast-unlinked application or the like is incorporated.

As an arbitrary broadcast-unlinked application is selected by an operation of the user using the remote controller on the menu of the broadcast-unlinked application displayed in the application launcher (Step S102), a script corresponding to the broadcast-unlinked application is executed, and thus the application controller 708 of the information processing apparatus 700 acquires an XML-AIT of the broadcast-unlinked application from the XML-AIT server 400 (Step S103).

The application controller 708 of the information processing apparatus 700 acquires the broadcast-unlinked application from the application server 300 based on application location information described in the acquired XML-AIT (Step S104) and immediately activates the acquired broadcast-unlinked application (Step S105).

Next, the application controller 708 of the information processing apparatus 700 validates a hash value and an electronic signature (Step S106). It should be noted that the details of the validation of the hash value and electronic signature will be described later.

When succeeding in the validation of the hash value and electronic signature (Y in Step S107), the application controller 708 monitors a broadcast resource access request from the broadcast-unlinked application (Step S108).

When failing in the validation of at least one of the hash value and the electronic signature (N in Step S107), the application controller 708 makes a setting so that an access to all broadcast resources by the broadcast-unlinked application is prohibited (Step S109) and monitors the broadcast resource access request from the broadcast-unlinked application after that (Step S108).

Upon detecting the broadcast resource access request from the broadcast-unlinked application (Y in Step S108), the application controller 708 references access permission information (access_permission) described in the acquired XML-AIT and judges whether the broadcast resource can be accessed by the broadcast-unlinked application (Step S110).

For example, the application identification descriptor 23 shown in FIG. 10 is acquired, and the value "10" as the access permission information (access_permission) means that all broadcast resources can be used. Here, the expression "all broadcast resources" refers to all types of media information to be broadcasted (video, audio, SI information, subtitle, data broadcast, etc.).

In this assumption, when a broadcast resource for which an access has been requested by the executed broadcast-unlinked application is a broadcast resource from a broadcast station belonging to a broadcast affiliation station "affiliation_A", it is judged that the broadcast resource can be accessed by the broadcast-unlinked application.

Further, when a broadcast resource for which an access has been requested by the executed broadcast-unlinked application is a broadcast resource from a broadcast station not belonging to a broadcast affiliation station and is a broadcast resource from a broadcast station other than the BS/CS broadcast station, it is judged that the broadcast resource cannot be accessed by the broadcast-unlinked application.

In the application identification descriptor 23 shown in FIG. 10, when the value "10" as the access permission information (access_permission) is defined as "video", it is judged that the access to the broadcast resource by the broadcast-unlinked application can only be made with respect to "video". Therefore, in this case, when the broadcast resource that the broadcast-unlinked application is attempting to access is "video and audio", the broadcast-unlinked application can use only the video and cannot use the audio.

Similarly, when the value "10" as the access permission information (access_permission) is defined as "broadcast resource other than SI information", it is judged that the access to the broadcast resource by the broadcast-unlinked application can only be made with respect to "broadcast resource other than SI information". Therefore, in this case, when the broadcast resource that the broadcast-unlinked application is attempting to access is "SI information", the broadcast-unlinked application can use the broadcast resource but cannot use the broadcast resource in the case of "video and audio".

When judging that the broadcast resource for which an access has been requested by the executed broadcast-unlinked application is a broadcast resource permitted to be accessed in the access permission information (access_permission) (Y in Step S111), the application controller 708 accesses the broadcast resource (Step S112).

Subsequently, based on the rendering permission information (rendering_permission), the application controller 708 determines a limit for an operation of the broadcast-unlinked application using the accessed broadcast resource (Step S113).

Here, a complementary explanation will be given on the limit for the operation of the broadcast-unlinked application.

As the limit for the operation of the broadcast-unlinked application, there is a limit regarding a method in a case of displaying a broadcast resource and an application.

An example of a method of displaying a broadcast resource and an application will be described below.

Figure 18:
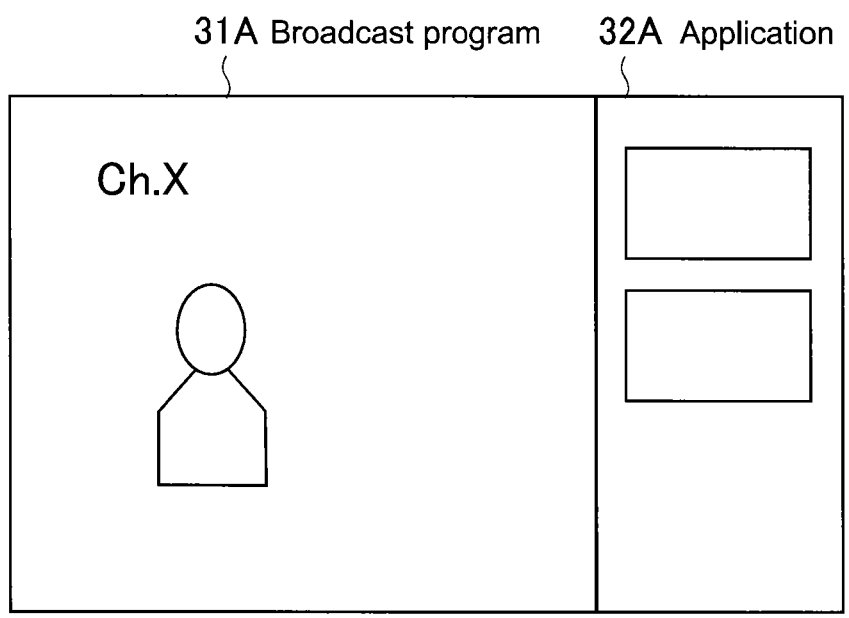
FIG. 18 A diagram showing an example of a display method of a broadcast resource and application.

FIG. 18 shows a method of displaying a selected broadcast program 31A and an application 32A on a divided screen and displaying the broadcast program 31A while changing a scaling, that is, a size thereof.

Figure 19:
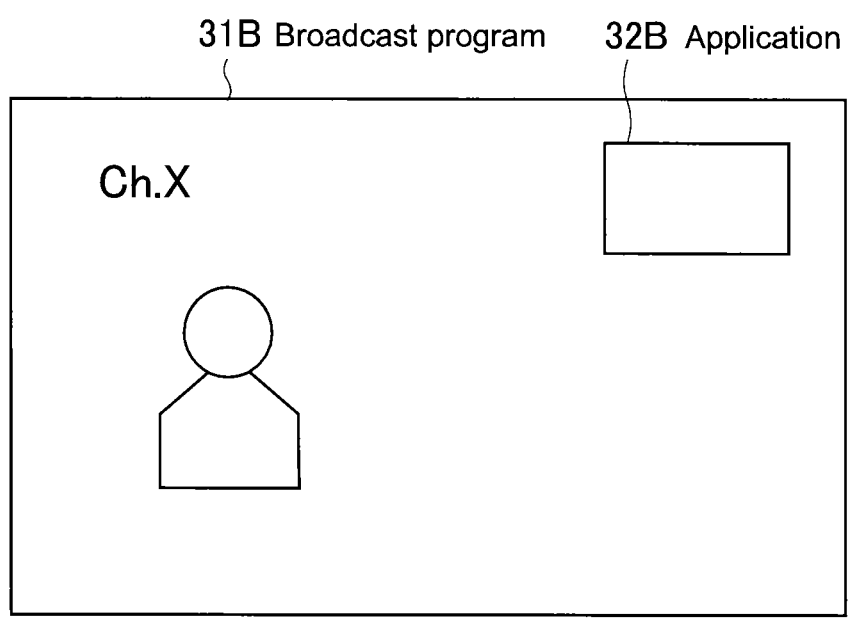
FIG. 19 A diagram showing another example of the display method of the broadcast resource and application.

FIG. 19 shows a method of displaying a selected broadcast program 31B on an entire screen and superimposing an application 32B on the broadcast program 31B.

Figure 20:
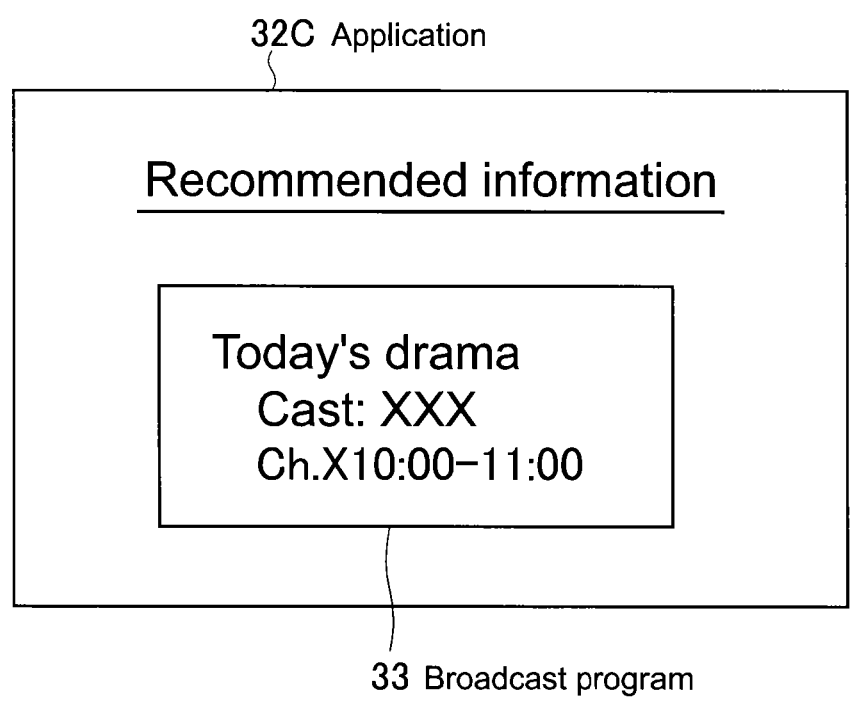
FIG. 20 A diagram showing another example of the display method of the broadcast resource and application.

FIG. 20 shows a method of displaying an application 32C on an entire screen and displaying program information 33 as one broadcast resource thereon.

Figure 21:
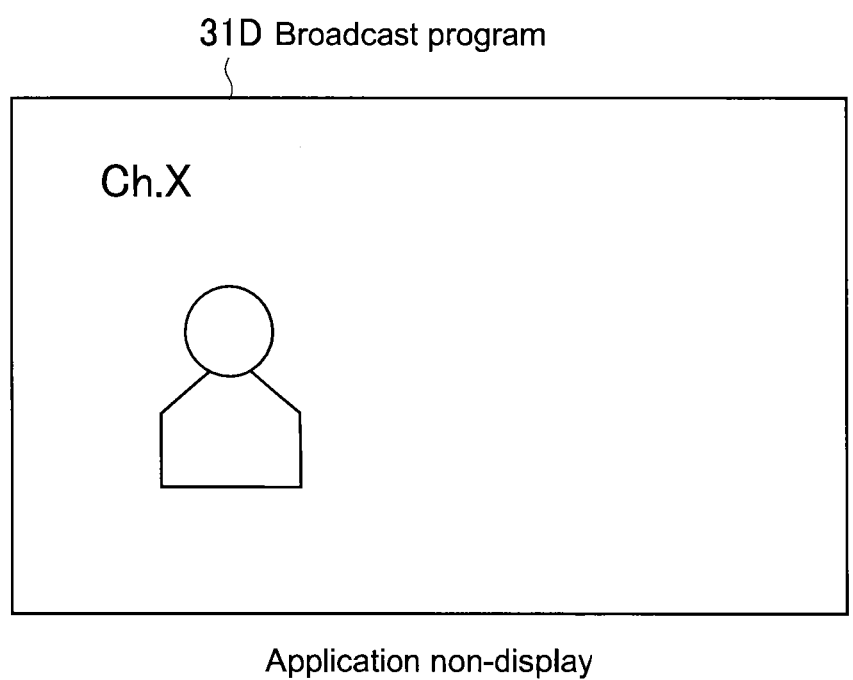
FIG. 21 A diagram showing another example of the display method of the broadcast resource and application.

FIG. 21 shows a method of displaying only a broadcast program 31D on an entire screen and not displaying an application.

For example, a case where a broadcast-unlinked application that is being executed in the information processing apparatus 700 attempts to access, for displaying program information of a broadcast program, SI information included in the program information will be discussed.

The application controller 708 of the information processing apparatus 700 references the rendering permission information (rendering_permission) and checks whether program information can be displayed. When the program information can be displayed, the application controller 708 displays the program information in the application area as shown in FIG. 20.

It should be noted that the operation example presupposes a case where a use of SI information is permitted in the access permission information (access_permission). If the use of SI information as a source of the program information is not permitted in the access permission information (access_permission), the program information is not displayed regardless of the information described in the rendering permission information (rendering_permission).

The descriptions above have been given on the limit for the operation of the broadcast-unlinked application.

Descriptions Will Return to FIG. 14.

When judging that a broadcast resource for which an access has been requested by an executed broadcast-unlinked application is a broadcast resource unpermitted to be accessed by the broadcast-unlinked application (N in Step S111), the application controller 708 does not access the broadcast resource so that the broadcast resource is not used by the broadcast-unlinked application being executed (Step S114). As a result, the broadcast-unlinked application continues the operation without using the broadcast resource.

After that, when an application end instruction or a shift to another application occurs by an operation of the user using a remote controller, for example (YES in Step S115), the application controller 708 of the information processing apparatus 700 ends the broadcast-unlinked application (Step S116).

Further, when an application control code other than "AUTOSTART", "DESTROY", and "KILL" is described in an XML-AIT newly acquired while the broadcast-unlinked application is being executed, the application controller 708 of the information processing apparatus 700 carries out processing of shifting the state of the broadcast-unlinked application according to the application control code (Step S117) and stands by for the next XML-MT after that.

Next, an operation carried out at the time of a direction tuning of a broadcast channel will be described with reference to FIGS. 13 and 15.

Figure 15:
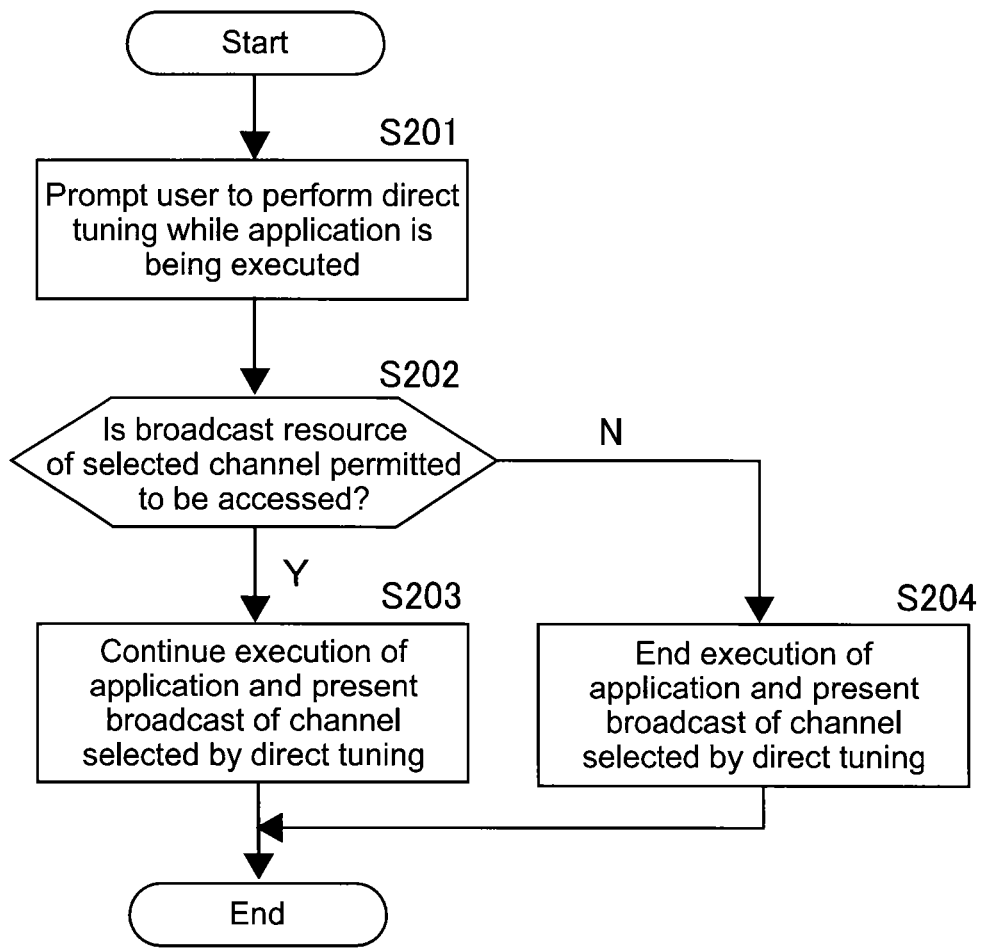
FIG. 15 A flowchart showing a processing procedure of the information processing apparatus at a time of a direct tuning of a broadcast channel.

FIG. 15 is a flowchart showing the operation carried out at the time of a direct tuning of a broadcast channel by the application controller 708 of the information processing apparatus 700.

There is a case where an operation of switching a broadcast channel (direct tuning operation) is carried out by a manual operation of the user while the broadcast-unlinked application is being executed as described above, for example. When such a direct tuning operation occurs (Step S201), the application controller 708 of the information processing apparatus 700 judges, based on access permission information (access_permission) described in the acquired XML-AIT, whether a broadcast resource of the broadcast channel selected by the direct tuning operation is a broadcast resource permitted to be used by the broadcast-unlinked application being executed (Step S202).

When the broadcast resource of the broadcast channel selected by the direct tuning operation is a broadcast resource permitted to be used by the broadcast-unlinked application being executed, the application controller 708 executes tuning processing of the broadcast channel selected by the direct tuning operation and presents the broadcast while continuing the execution of the broadcast-unlinked application (Step S203). Further, when the broadcast channel selected by the direct tuning operation is a broadcast resource unpermitted to be used by the broadcast-unlinked application being executed, the broadcast-unlinked application is ended, and the tuning processing of the broadcast channel selected by the direct tuning operation is executed to present the broadcast (Step S204). It should be noted that as a modified example at this time, it is also possible to continue the execution of the broadcast-unlinked application and notify the user that the broadcast resource is unpermitted to be used.

Figure 16:
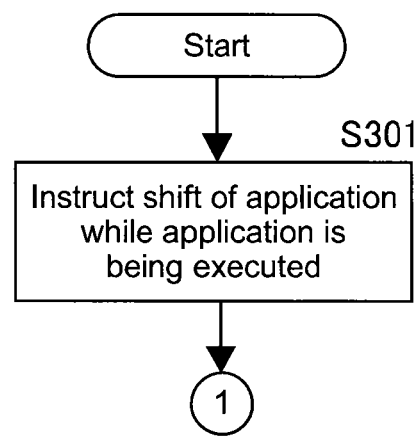
FIG. 16 A flowchart showing an operation of the information processing apparatus when an application is shifted.

Next, an operation of a case where a shift of a broadcast-unlinked application occurs will be described with reference to FIGS. 13, 14, and 16.

When an instruction to shift a broadcast-unlinked application occurs by an execution of a script incorporated into a broadcast-unlinked application being executed or a manual operation of the user (Step S301 of FIG. 16), the application controller 708 of the information processing apparatus 700 acquires an XML-AIT of a shift-destination broadcast-unlinked application from the XML-AIT server 400 (Step S103 of FIG. 14). The application controller 708 acquires a broadcast-unlinked application from the application server 300 based on application location information described in the XML-AIT (Step S104 of FIG. 14) and activates it (Step S105 of FIG. 14).

Similarly, the application controller 708 validates the hash value and electronic signature and when succeeding in the validation, judges whether an access to the broadcast resource by the broadcast-unlinked application is permitted based on the access permission information (access_permission) at a timing at which a broadcast resource access request from the broadcast-unlinked application being executed is detected. When the broadcast resource for which an access has been requested by the broadcast-unlinked application being executed is a broadcast resource permitted to be accessed by the broadcast-unlinked application being executed, the application controller 708 accesses the broadcast resource and determines a limit for the operation of the broadcast-unlinked application being executed based on a content of rendering permission information (rendering_permission). Further, when the broadcast resource for which an access has been requested by the executed broadcast-unlinked application is a broadcast resource unpermitted to be accessed by the executed broadcast-unlinked application, the application controller 708 invalidates the use such as a presentment of a broadcast resource by not executing an access (tuning) to the broadcast resource.

Heretofore, the control of the use of a broadcast resource by a broadcast-unlinked application has been described.

(2. Generation and validation of electronic signature and hash value)

Next, the generation and validation of an electronic signature and has value will be described.

Figure 17:
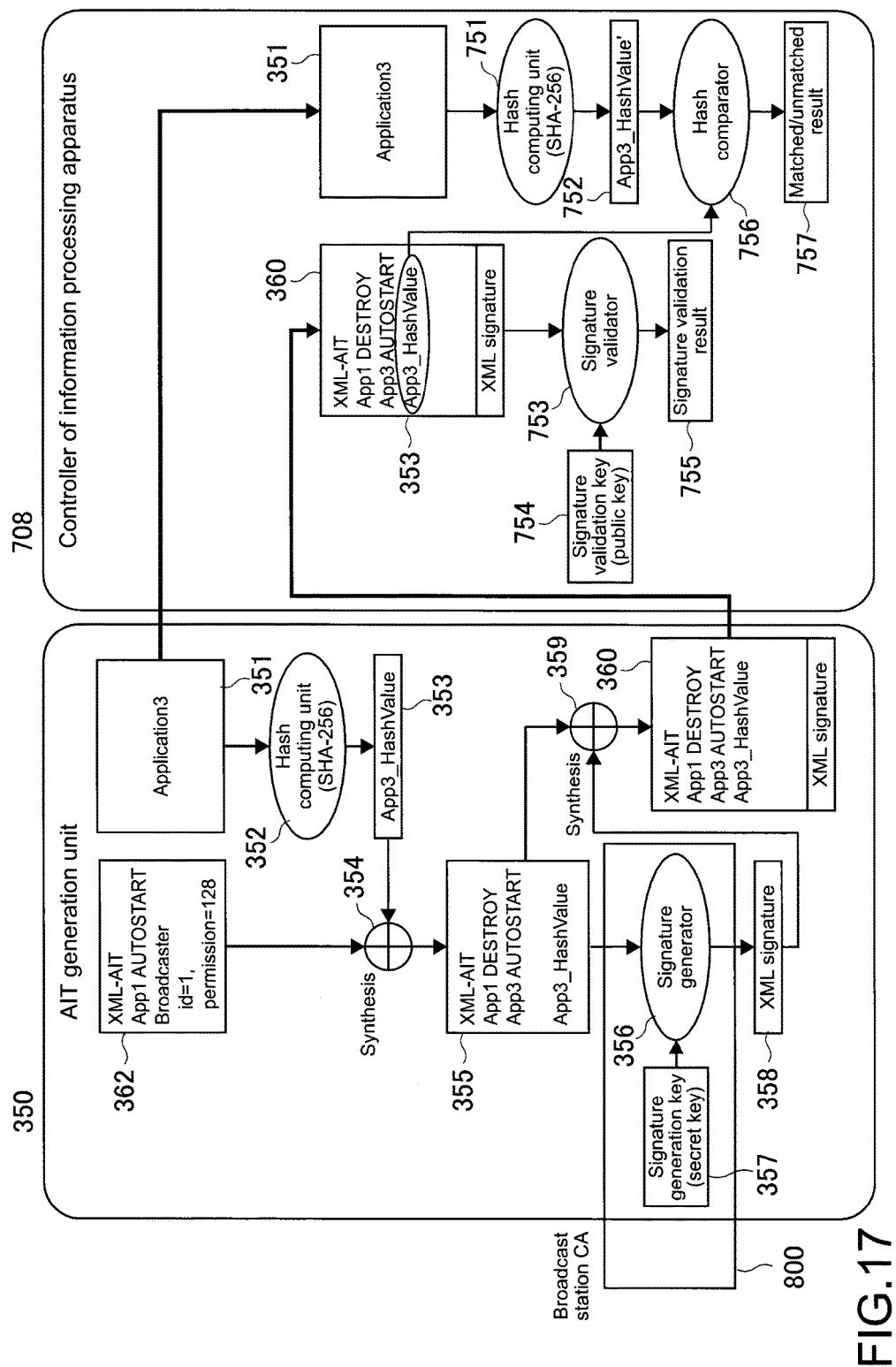
FIG. 17 A block diagram for explaining a mechanism of a generation and validation of an electronic signature and hash value.

FIG. 17 is a block diagram for explaining a mechanism of the generation and validation of an electronic signature and hash value.

The XML-AIT server 400 and the application server 300 may be a single server or may be different servers. Here, the XML-AIT server 400 and the application server 300 are collectively referred to as "server". The server is an apparatus including a typical computer structure, which is constituted of a CPU, a main memory, a storage device such as an HDD, an input apparatus such as a mouse and a keyboard, a display unit such as a liquid crystal display, and the like. The main memory and the storage device store an OS (Operating System), software such as a server application program, a broadcast-unlinked application to be provided to the information processing apparatus 700, an XML-AIT file for each application, a signature generation key, and the like. The server application program includes a program for generating an electronic signature and a hash value.

The server includes an AIT generation unit 350. Specifically, the AIT generation unit 350 is realized by the program for generating an electronic signature and a hash value loaded to the main memory and the CPU that executes the program.

The AIT generation unit 350 carries out the following processing.

1. The AIT generation unit 350 calculates a hash value 353 using a predetermined hash computing unit 352 based on a substance of an application 351 (binary code). As a hash algorithm, there are SHA-1, SHA-2, and the like standardized by FIPS-PUB-180-1, 180-2, for example.

2. The AIT generation unit 350 synthesizes the hash value 353 with an XML-AIT of the application 351 (354) and generates a hash value-attached XML-AIT 355.

3. The AIT generation unit 350 requests a broadcast station CA (Certification Authority) 800 to authenticate the application 351 and the XML-AIT 355.

As shown in FIG. 1, upon receiving the request of an authentication task related to the use of a broadcast resource from a broadcast station or broadcast affiliation station, the broadcast station CA 800 executes the task. The broadcast station CA 800 checks the application 351 and a content of the XML-AIT 355 as targets of the authentication requested by an application creator excluding the broadcast station and when there is no problem in the content, sets a secret key out of a pair of the secret key and a public key issued by a route CA 900 as a signature generation key in a signature generator 356. The signature generator 356 generates a digest using a hash function for a signature with respect to the hash value-attached XML-AIT 355 and encrypts the digest using the signature generation key (secret key) 357 to generate an XML signature 358. The broadcast station CA 800 sends the generated XML signature 358 to the server as a response.

4. The AIT generation unit 350 of the server adds the hash value-attached XML-AIT 355 to the XML signature 358 as a response from the broadcast station CA (359) and generates an electronic signature-attached XML-AIT 360.

5. Then, the AIT generation unit 350 of the server provides the electronic signature-attached XML-AIT 360 to the information processing apparatus 700. It should be noted that the public key corresponding to the secret key used in generating the XML signature 358 is given to the information processing apparatus 700 through a different route, and the application controller 708 of the information processing apparatus 700 holds the public key.

The application controller 708 of the information processing apparatus 700 carries out the following processing.

1. The application controller 708 calculates a hash value 752 using a predetermined hash computing unit 751 (hash function) from a substance of the application 351 (binary code) acquired from the server. The hash function used herein needs to be the same as that of the hash computing unit 352 of the AIT generation unit 350 of the server. In this regard, the application controller 708 checks the hash algorithm described in the electronic signature-attached XML-AIT 360 acquired from the server and judges whether it is consistent with the hash algorithm of the hash computing unit 751 (hash function). If the hash algorithms are inconsistent, the application controller 708 switches the hash computing unit 751 (hash function) and matches it with that of the hash computing unit 352 of the AIT generation unit 350 of the server.

2. The application controller 708 uses a hash comparator 756 to compare the hash value 353 and the hash value 752 extracted from the electronic signature-attached XML-AIT 360 acquired from the server and acquires a matched/unmatched result 757.

3. The application controller 708 extracts an XML signature from the electronic signature-attached XML-AIT 360 acquired from the server in a signature generator 753 and acquires a signature validation result 755 obtained by validating the XML signature using a signature validation key (public key) 754.

The generation of the electronic signature and hash value in the server and the validation of the electronic signature and hash value in the information processing apparatus 700 are carried out as described above.

Effects of Embodiment Etc

This embodiment bears the following effects.

1. According to this embodiment, access permission information (access_permission) that designates a type of media information (video, audio, SI information, subtitle, data broadcast, etc.) of a broadcast resource usable by a broadcast-unlinked application can be described in the XML-AIT. As a result, whether a broadcast resource can be used by a broadcast-unlinked application can be segmentalized and defined in a unit of the type of media information in the broadcast resource.

2. According to this embodiment, rendering permission information (rendering_permission) that limits an operation of a broadcast-unlinked application using a broadcast resource, such as a display method of a broadcast resource usable by a broadcast-unlinked application, is described in the XML-AIT in association with access permission information (access_permission). As a result, an intention of a creator of a broadcast resource can be reflected on the display method of a broadcast resource usable by a broadcast-unlinked application, and the like.

3. According to this embodiment, the access permission information (access_permission) and rendering permission information (rendering_permission) can be described in the XML-AIT as resource permission information (resouce_permission) in association with information in a broadcast unit, such as a broadcast station affiliation, a broadcast station, a channel, and an event (program). As a result, the access permission information (access_permission) and rendering permission information (rendering_permission) can be defined in various broadcast units.

4. Incidentally, the intention of a creator of a broadcast resource is reflected on the resource permission information (resouce_permission) through content checks of a broadcast-unlinked application and XML-AIT in the broadcast station CA 800, the specific mechanism of which is as follows.

Specifically, in this embodiment, the broadcast station CA 800 that has received a request for an authentication task from a broadcast station affiliation or a broadcast station checks contents of a broadcast-unlinked application and XML-AIT as targets of the authentication requested by an application creator excluding the broadcast station, and when there is no problem, attaches an electronic signature to the XML-AIT and returns it to the application creator. When there is a problem in the content of the resource permission information (resouce_permission) in the content checks of the broadcast-unlinked application and XML-AIT, the broadcast station CA 800 feeds back an improvement point to the application creator. Based on the improvement point fed back from the broadcast station CA 800, the application creator updates the content of the XML-AIT and again requests the broadcast station CA 800 for an authentication.

Modified Example

Although the embodiment presupposing the HbbTV standard has been described, the present disclosure is not necessarily limited to such a presupposition.

In addition, the present disclosure is not limited to the embodiment above and can be variously modified without departing from the gist of the present disclosure.

REFERENCE SIGNS LIST

1 information processing system
100 broadcast facility
200 first network
300 application server
400 XML-AIT server
700 information processing apparatus
701 broadcast interface
702 demultiplexer
703 output processing unit
704 video decoder
705 audio decoder
706 subtitle decoder
707 communication interface
708 application controller
800 broadcast station CA

The invention claimed is:

1. An information processing apparatus, comprising:
circuitry configured to:
receive a unit of media information from a broadcast source;
acquire application information corresponding to executing an application, the application information including plural sets of access information corresponding to executing the application, each set of the plural sets of access information including first definition information, second definition information in association with the first definition information, and broadcast unit information in association with the first definition information, the broadcast unit information specifying an accessible broadcast source, the first definition information specifying at least one of a plurality of types of media information that the application when being executed is permitted to access through the accessible broadcast source specified in the associated broadcast unit information, and the second definition information limiting an operation of the application that accesses the at least one of the plurality of types of media information specified in the first definition information;
in response to an access request from the application when being executed to access the unit of media information, determine whether accessing the unit of media information from the broadcast source by the application when being executed is permitted based on whether a combination of a type of the unit of media information and the broadcast source is included in one of the plural sets of access information
display an interface of the application and a broadcast program simultaneously by dividing a display screen area; and
in case that accessing the unit of media information in response to the request from the application when being executed is determined to be permitted, display, based on the second definition information of the one of the plural sets of access information that corresponds to the broadcast source, the unit of media information simultaneously with the interface of the application.

2. The information processing apparatus according to claim 1,
wherein the circuitry is further configured to control, in case that accessing the unit of media information in response to the request from the application when being executed is determined to be permitted based on the one of the plural sets of access information, the operation of the application based on the second definition information of the one of the plural sets of access information.

3. The information processing apparatus according to claim 1,
wherein the application information further includes information requisite for validating the application information, and wherein the circuitry is further configured to validate the application information using the information requisite for validating the application information prior to determining whether accessing the unit of media information in response to the request from the application when being executed is permitted.

4. The information processing apparatus according to claim 1, wherein the circuitry is further configured to:
determine, when a broadcast channel switch instruction from a user occurs while the application is being executed, whether accessing another unit of media information from a switch-destination broadcast source in response to the request from the application when being executed is permitted based on the plural sets of access information;
cause the application to be continuously executed and allow accessing the another unit of media information from the switch-destination broadcast source when determined that accessing the another unit of media information from the switch-destination broadcast source in response to the request from the application is permitted; and
cause the application to end and prohibit accessing the another unit of media information from the switch-destination broadcast source when determined that accessing the another unit of media information from the switch-destination broadcast source in response to the request from the application is not permitted.

5. The information processing apparatus according to claim 1, wherein the information processing apparatus is a television apparatus.

6. The information processing apparatus according to claim 1, wherein the application information is described in a markup language.

7. The information processing apparatus according to claim 6, wherein the application information is described in an Extensible Markup Language (XML).

8. The information processing apparatus according to claim 1, wherein the one of the plural sets of access information includes a descriptor including
the corresponding first definition information specifying one of the plurality of types of media information,
the corresponding second definition information specifying rendering permission information for limiting an operation of the application that accesses a particular unit of media information of the one of the plurality of types specified in the corresponding first definition information, and
the corresponding broadcast unit information specifying an accessible broadcast source.

9. An information processing method, comprising:
receiving a unit of media information from a broadcast source;
acquiring application information corresponding to executing an application, the application information including plural sets of access information corresponding to executing the application, each set of the plural sets of access information including first definition information, second definition information in association with the first definition information, and broadcast unit information in association with the first definition information, the broadcast unit information specifying an accessible broadcast source, the first definition information specifying at least one of a plurality of types of media information that the application when being executed is permitted to access through the accessible broadcast source specified in the associated broadcast unit information, and the second definition information limiting an operation of the application that accesses the at least one of the plurality of types of media information specified in the first definition information;
in response to an access request from the application when being executed to access the unit of media information, determining, by circuitry of an information processing apparatus, whether accessing the unit of media information from the broadcast source by the application when being executed is permitted based on whether a combination of a type of the unit of media information and the broadcast source is included in one of the plural sets of access information;
displaying an interface of the application and a broadcast program simultaneously by dividing a display screen area; and
in case that accessing the unit of media information in response to the request from the application when being executed is determined to be permitted, displaying, based on the second definition information of the one of the plural sets of access information that corresponds to the broadcast source, the unit of media information simultaneously with the interface of the application.

10. The information processing method according to claim 9, further comprising:
controlling, in case that accessing the unit of media information in response to the request from the application when being executed is determined to be permitted based on the one of the plural sets of access information, an operation of the application based on the second definition information included in the one of the plural sets of access information.

11. The information processing method according to claim 9, further comprising:
validating the application information prior to determining whether accessing the unit of media information in response to the request from the application when being executed is permitted,
wherein the application information further includes information for validating the application information.

12. The information processing method according to claim 9, further comprising:
determining, when a broadcast channel switch instruction from a user occurs while the application is being executed, whether accessing another unit of media information from a switch-destination broadcast source in response to the request from the application when being executed is permitted based on the plural sets of access information;
causing the application to be continuously executed and allowing accessing the another unit of media information from the switch-destination broadcast source when determined that accessing the another unit of media information from the switch-destination broadcast channel in response to the request from the application is permitted; and
causing the application to end and prohibiting accessing the another unit of media information from the switch-destination broadcast source when determined that accessing the another unit of media information from the switch-destination broadcast source in response to the request from the application is not permitted.

13. The information processing method according to claim 9, wherein the application information is described in a markup language.

14. The information processing method according to claim 9, wherein the one of the plural sets of access information includes a descriptor including
the corresponding first definition information specifying one of the plurality of types of media information,
the corresponding second definition information specifying rendering permission information for limiting an operation of the application that accesses a particular unit of media information of the one of the plurality of types specified in the corresponding first definition information, and
the corresponding broadcast unit information specifying an accessible broadcast source.

15. A non-transitory computer readable storage medium, having stored thereon a set of computer-executable instructions that causes a computer to perform a method comprising:
receiving a unit of media information from a broadcast source;
acquiring application information corresponding to executing an application, the application information including plural sets of access information corresponding to executing the application, each set of the plural sets of access information including first definition information, second definition information in association with the first definition information, and broadcast unit information in association with the first definition information, the broadcast unit information specifying an accessible broadcast source, the first definition information specifying at least one of a plurality of types of media information that the application when being executed is permitted to access through the accessible broadcast source specified in the associated broadcast unit information, and the second definition information limiting an operation of the application that accesses the at least one of the plurality of types of media information specified in the first definition information;
in response to an access request from the application when being executed to access the unit of media information, determining whether accessing the unit of media information from the broadcast source by the application when being executed is permitted based on whether a combination of a type of the unit of media information and the broadcast source is included in one of the plural sets of access information;
displaying an interface of the application and a broadcast program simultaneously by dividing a display screen area; and
in case that accessing the unit of media information in response to the request from the application when being executed is determined to be permitted, displaying, based on the second definition information of the one of the plural sets of access information that corresponds to the broadcast source, the unit of media information simultaneously with the interface of the application.

16. A server apparatus, comprising
circuitry configured to:
generate application information corresponding to executing an application, the application information including plural sets of access information corresponding to executing the application, each set of the plural sets of access information including first definition information, second definition information in association with the first definition information, and broadcast unit information in association with the first definition information, the broadcast unit information specifying an accessible broadcast source, the first definition information specifying at least one of a plurality of types of media information to which access through the accessible broadcast source specified in the associated broadcast unit information is permitted and the second definition information limiting an operation of the application that accesses the at least one of the plurality of types of media information specified in the first definition information, wherein accessing a unit of media information from a particular broadcast source in response to a request from the application when being executed is permitted when a combination of a type of the unit of media information requested by the application and the particular broadcast source is included in one of the plural sets of access information; and
transmit the application information to an information processing apparatus in response to an acquisition request for the application information from the information processing apparatus,
wherein the information processing apparatus displays an interface of the application and a broadcast program simultaneously by dividing a display screen area, and
wherein the information processing apparatus, in case that accessing the unit of media information in response to the request from the application when being executed is determined to be permitted, displays, based on the second definition information of the one of the plural sets of access information that corresponds to the broadcast source, the unit of media information simultaneously with the interface of the application.

17. The server apparatus according to claim 16, wherein the circuitry is further configured to include, in the application information, information requisite for validating the application information.

* * * * *